US005839101A

United States Patent [19]

Vähätalo et al.

[11] Patent Number: 5,839,101

[45] Date of Patent: Nov. 17, 1998

[54] NOISE SUPPRESSOR AND METHOD FOR SUPPRESSING BACKGROUND NOISE IN NOISY SPEECH, AND A MOBILE STATION

[75] Inventors: Antti Vähätalo; Juha Häkkinen; Erkki Paajanen; Ville-Veikko Mattila, all of Tampere, Finland

[73] Assignee: Nokia Mobile Phones Ltd., Salo, Finland

[21] Appl. No.: 762,938

[22] Filed: Dec. 10, 1996

[30] Foreign Application Priority Data

Dec. 12, 1995 [FI] Finland .................................... 955947

[51] Int. Cl.$^{6}$ ...................................................... H04B 15/00

[52] U.S. Cl. .......................... 704/226; 704/268; 704/227; 704/217; 704/233

[58] Field of Search .................................... 704/217, 227, 704/226, 233

[56] References Cited

U.S. PATENT DOCUMENTS

| | | | |
|---|---|---|---|
| 4,071,826 | 1/1978 | Miller, Jr. et al. | 704/233 |
| 4,628,529 | 12/1986 | Borth et al. | 381/94 |
| 4,630,304 | 12/1986 | Borth et al. | 361/94 |
| 4,630,305 | 12/1986 | Borth et al. | 381/94 |
| 4,672,669 | 6/1987 | DesBlache et al. | 704/233 |
| 4,811,404 | 3/1989 | Vilmur | 381/94 |
| 4,897,878 | 1/1990 | Boll et al. | 381/43 |
| 5,012,519 | 4/1991 | Adlersberg et al. | 381/47 |
| 5,027,410 | 6/1991 | Williamson et al. | 381/68.4 |
| 5,285,165 | 2/1994 | Renfors et al. | 328/167 |
| 5,355,431 | 10/1994 | Kane et al. | 704/226 |
| 5,406,622 | 4/1995 | Silverberg et al. | 379/387 |
| 5,406,635 | 4/1995 | Jarvinen | 381/94 |
| 5,461,655 | 10/1995 | Vuylsteke et al. | 378/62 |
| 5,471,527 | 11/1995 | Ho et al. | 379/347 |
| 5,485,522 | 1/1996 | Solve et al. | 381/56 |
| 5,533,133 | 7/1996 | Lamkin et al. | 381/94 |
| 5,544,250 | 8/1996 | Urbanski | 381/94 |
| 5,550,924 | 8/1996 | Helf et al. | 381/94 |
| 5,659,622 | 8/1997 | Ashley | 704/227 |
| 5,689,615 | 11/1997 | Benyassine et al. | 704/233 |
| 5,706,394 | 1/1998 | Wynn | 704/233 |

FOREIGN PATENT DOCUMENTS

| | | |
|---|---|---|
| 0 588 526 A1 | 3/1994 | European Pat. Off. . |
| 3230391A1 | 2/1984 | Germany . |
| WO 94/18666 | 8/1994 | WIPO . |
| WO 95/16259 | 6/1995 | WIPO . |

OTHER PUBLICATIONS

R.J. McAulay et al., "Speech enhancement using a soft–decision noise suppression filter", IEEE Trans. on Acoustics, Speech and Signal Processing, vol. 28, No. 2, 1980, pp. 137–145.

*Primary Examiner*—David R. Hudspeth
*Assistant Examiner*—Daniel Abebe
*Attorney, Agent, or Firm*—Perman & Green, LLP

[57] ABSTRACT

The invention relates to a method of noise suppression, a mobile station and a noise suppressor for suppressing noise in a speech signal. The suppressor comprises means (20, 50) for dividing the speech signal into a first amount of subsignals (X, P), which subsignals represent certain first frequency ranges, and suppression means (30) for suppressing noise in a subsignal (X, P) based upon a determined suppression coefficient (G). The noise suppressor further comprises recombination means (60) for recombining a second amount of subsignals (X, P) into a calculation signal (S), which represents a certain second frequency range, which is wider than the first frequency ranges and determination means (200) for determining a suppression coefficient (G) for the calculation signal (S) based upon the noise contained by it. The suppression means (30) are arranged to suppress the subsignals (X, P) recombined into the calculation signal (S) by said suppression coefficient (G), determined based upon the calculation signal (S).

19 Claims, 12 Drawing Sheets

NOISE SUPPRESSOR AND METHOD FOR SUPPRESSING BACKGROUND NOISE IN NOISY SPEECH, AND A MOBILE STATION

FIELD OF THE INVENTION

This invention relates to a noise suppression method, a mobile station and a noise suppressor for suppressing noise in a speech signal, which suppressor comprises means for dividing said speech signal in a first amount of subsignals, which subsignals represent certain first frequency ranges, and suppression means for suppressing noise in a subsignal according to a certain suppression coefficient. A noise suppressor according to the invention can be used for cancelling acoustic background noise, particularly in a mobile station operating in a cellular network. The invention relates in particular to background noise suppression based upon spectral subtraction.

BACKGROUND OF THE INVENTION

Various methods for noise suppression based upon spectral subtraction are known from prior art. Algorithms using spectral subtraction are in general based upon dividing a signal in frequency components according to frequency, that is into smaller frequency ranges, either by using Fast Fourier Transform (FFT), as has been presented in patent publications WO 89/06877 and U.S. Pat. No. 5,012,519, or by using filter banks, as has been presented in patent publications U.S. Pat. No. 4,630,305, U.S. Pat. No. 4,630,304, U.S. Pat. No. 4,628,529, U.S. Pat. No. 4,811,404 and EP 343 792. In prior solutions based upon spectral subtraction the components corresponding to each frequency range of the power spectrum (amplitude spectrum) are calculated and each frequency range is processed separately, that is, noise is suppressed separately for each frequency range. Usually this is done in such a way that it is detected separately for each frequency range whether the signal in said range contains speech or not, if not, noise is concerned and the signal is suppressed. Finally signals of each frequency range are recombined, resulting in an output which is a noise-suppressed signal. The disadvantage of prior known methods based upon spectral subtraction has been the large amount of calculations, as calculating has to be done individually for each frequency range. Noise suppression methods based upon spectral subtraction are in general based upon the estimation of a noise signal and upon utilizing it for adjusting noise attenuations on different frequency bands. It is prior known to quantify the variable representing noise power and to utilize this variable for amplification adjustment. In patent U.S. Pat. No. 4,630,305 a noise suppression method is presented, which utilizes tables of suppression values for different ambient noise values and strives to utilize an average noise level for attenuation adjusting.

In connection with spectral subtraction windowing is known. The purpose of windowing is in general to enhance the quality of the spectral estimate of a signal by dividing the signal into frames in time domain. Another basic purpose of windowing is to segment an unstationary signal, e.g. speech, into segments (frames) that can be regarded stationary. In windowing it is generally known to use windowing of Hamming, Hanning or Kaiser type. In methods based upon spectral subtraction it is common to employ so called 50% overlapping Hanning windowing and so called overlap-add method, which is employed in connection with inverse FFT (IFFT).

The problem with all these prior known methods is that the windowing methods have a specific frame length, and the length of a windowing frame is difficult to match with another frame length. For example in digital mobile phone networks speech is encoded by frames and a specific speech frame is used in the system, and accordingly each speech frame has the same specified length, e.g. 20 ms. When the frame length for windowing is different from the frame length for speech encoding, the problem is the generated total delay, which is caused by noise suppression and speech encoding, due to the different frame lengths used in them.

SUMMARY OF THE INVENTION

In the method for noise suppression according to the present invention, an input signal is first divided into a first amount of frequency bands, a power spectrum component corresponding to each frequency band is calculated, and a second amount of power spectrum components are recombined into a calculation spectrum component that represents a certain second frequency band which is wider than said first frequency bands, a suppression coefficient is determined for the calculation spectrum component based upon the noise contained in it, and said second amount of power spectrum components are suppressed using a suppression coefficient based upon said calculation spectrum component. Preferably several calculation spectrum components representing several adjacent frequency bands are formed, with each calculation spectrum component being formed by recombining different power spectrum components. Each calculation spectrum component may comprise a number of power spectrum components different from the others, or it may consist of a number of power spectrum components equal to the other calculation spectrum components. The suppression coefficients for noise suppression are thus formed for each calculation spectrum component and each calculation spectrum component is attenuated, which calculation spectrum components after attenuation are reconverted to time domain and recombined into a noise-suppressed output signal. Preferably the calculation spectrum components are fewer than said first amount of frequency bands, resulting in a reduced amount of calculations without a degradation in voice quality.

An embodiment according to this invention employs preferably division into frequency components based upon the FFT transform. One of the advantages of this invention is, that in the method according to the invention the number of frequency range components is reduced, which correspondingly results in a considerable advantage in the form of fewer calculations when calculating suppression coefficients. When each suppression coefficient is formed based upon a wider frequency range, random noise cannot cause steep changes in the values of the suppression coefficients. In this way also enhanced voice quality is achieved here, because steep variations in the values of the suppression coefficients sound unpleasant.

In a method according to the invention frames are formed from the input signal by windowing, and in the windowing such a frame is used, the length of which is an even quotient of the frame length used for speech encoding. In this context an even quotient means a number that is divisible evenly by the frame length used for speech encoding, meaning that e.g. the even quotients of the frame length 160 are 80, 40, 32, 20, 16, 8, 5, 4, 2 and 1. This kind of solution remarkably reduces the inflicted total delay.

Additionally, another difference of the method according to the invention, in comparison with the before mentioned U.S. Pat. No. 4,630,305, is accounting for average speech power and determining relative noise level. By determining estimated speech level and noise level, and using them for noise suppression a better result is achieved than by using only noise level, because in regard of a noise suppression algorithm the ratio between speech level and noise level is essential.

Further, in the method according to the invention, suppression is adjusted according to a continuous noise level value (continuous relative noise level value), contrary to prior methods which employ fixed values in tables. In the solution according to the invention suppression is reduced according to the relative noise estimate, depending on the current signal-to-noise ratio on each band, as is explained later in more detail. Due to this, speech remains as natural as possible and speech is allowed to override noise on those bands where speech is dominant. The continuous suppression adjustment has been realized using variables with continuous values. Using continuous, that is non-table, parameters makes possible noise suppression in which no large momentary variations occur in noise suppression values. Additionally, there is no need for large memory capacity, which is required for the prior known tabulation of gain values.

A noise suppressor and a mobile station according to the invention is wherein it further comprises the recombination means for recombining a second amount of subsignals into a calculation signal, which represents a certain second frequency range which is wider than said first frequency ranges, determination means for determining a suppression coefficient for the calculation signal based upon the noise contained in it, and that suppression means are arranged to suppress the subsignals recombined into the calculation signal by said suppression coefficient, which is determined based upon the calculation signal.

A noise suppression method according to the invention is wherein prior to noise suppression, a second amount of subsignals is recombined into a calculation signal which represents a certain second frequency range which is wider than said first frequency ranges, a suppression coefficient is determined for the calculation signal based upon the noise contained in it, and that subsignals recombined into the calculation signal are suppressed by said suppression coefficient, which is determined based upon the calculation signal.

BRIEF DESCRIPTION OF THE DRAWINGS

In the following a noise suppression system according to the invention is illustrated in detail, referring to the enclosed figures, in which.

DETAILED DESCRIPTION

Figure 1:
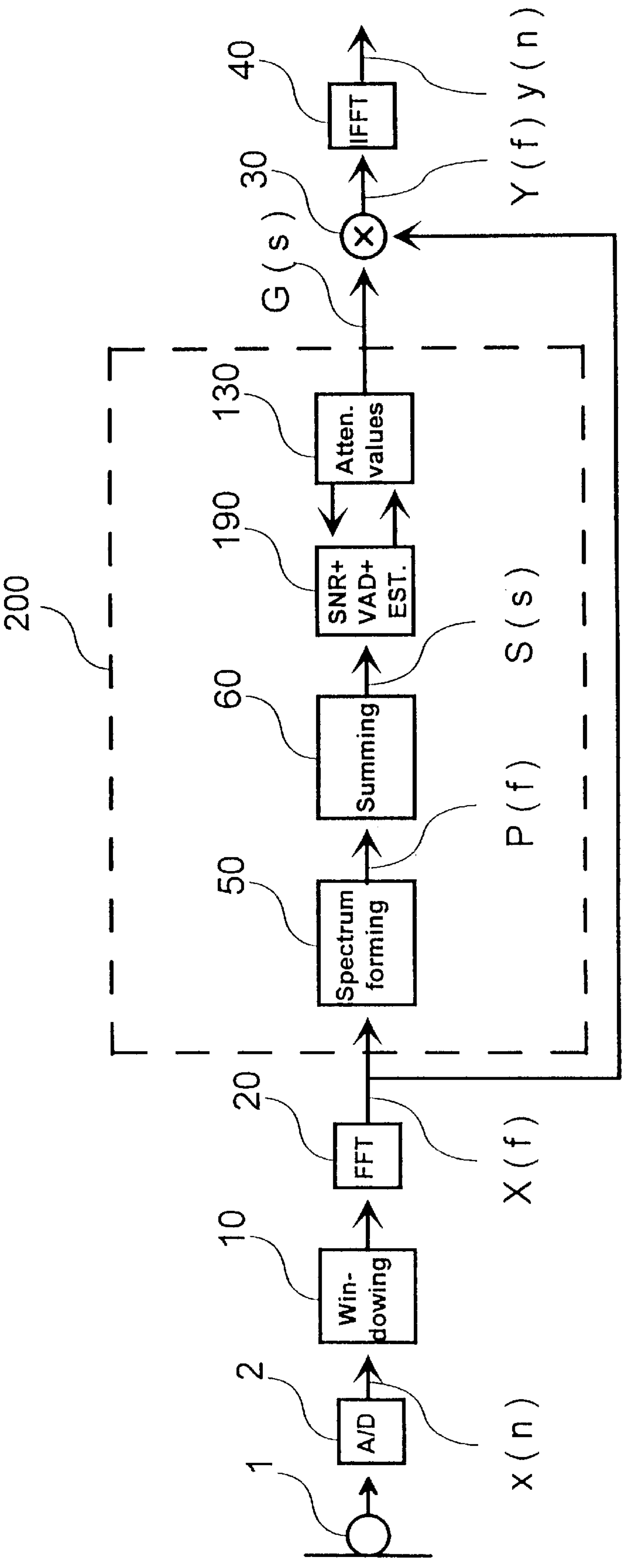
FIG. 1 presents a block diagram on the basic functions of a device according to the invention for suppressing noise in a speech signal.

FIG. 1 presents a block diagram of a device according to the invention in order to illustrate the basic functions of the device. One embodiment of the device is described in more detail in FIG. 2. A speech signal coming from the microphone 1 is sampled in an A/D-converter 2 into a digital signal x(n).

An amount of samples, corresponding to an even quotient of the frame length used by the speech codec, is taken from digital signal x(n) and they are taken to a windowing block 10. In windowing block 10 the samples are multiplied by a predetermined window in order to form a frame. In block 10 samples are added to the windowed frame, if necessary, for adjusting the frame to a length suitable for Fourier transform. After windowing a spectrum is calculated for the frame in FFT block 20 employing the Fast Fourier Transform (FFT).

After the FFT calculation 20, a calculation for noise suppression is done in calculation block 200 for suppression of noise in the signal. In order to carry out the calculation for noise suppression, a spectrum of a desired type, e.g. amplitude or power spectrum P(f), is formed in spectrum forming block 50, based upon the spectrum components X(f) obtained from FFT block 20. Each spectrum component P(f) represents in frequency domain a certain frequency range, meaning that utilizing spectra the signal being processed is divided into several signals with different frequencies, in other words into spectrum components P(f). In order to reduce the amount of calculations, adjacent spectrum components P(f) are summed in calculation block 60, so that a number of spectrum component combinations, the number of which is smaller than the number of the spectrum components P(f), is obtained and said spectrum component combinations are used as calculation spectrum components S(s) for calculating suppression coefficients. Based upon the calculation spectrum components S(s), it is detected in an estimation block 190 whether a signal contains speech or background noise, a model for background noise is formed and a signal-to-noise ratio is formed for each frequency range of a calculation spectrum component. Based upon the signal-to-noise ratios obtained in this way and based upon the background noise model, suppression values G(s) are calculated in calculation block 130 for each calculation spectrum component S(s).

In order to suppress noise, each spectrum component X(f) obtained from FFT block 20 is multiplied in multiplier unit 30 by a suppression coefficient G(s) corresponding to the frequency range in which the spectrum component X(f) is located. An Inverse Fast Fourier Transform IFFT is carried out for the spectrum components adjusted by the noise suppression coefficients G(s), in IFFT block 40, from which samples are selected to the output, corresponding to samples selected for windowing block 10, resulting in an output, that is a noise-suppressed digital signal y(n), which in a mobile station is forwarded to a speech codec for speech encoding. As the amount of samples of digital signal y(n) is an even quotient of the frame length employed by the speech codec, a necessary amount of subsequent noise-suppressed signals y(n) are collected to the speech codec, until such a signal frame is obtained which corresponds to the frame length of the speech codec, after which the speech codec can carry out the speech encoding for the speech frame. Because the frame length employed in the noise suppressor is an even quotient of the frame length of the speech codec, a delay caused by different lengths of noise suppression speech frames and speech codec speech frames is avoided in this way.

Because there are fewer calculation spectrum components S(s) than spectrum components P(f), calculating suppression components based upon them is considerably easier than if the power spectrum components P(f) were used in the calculation. Because each new calculation spectrum component S(s) has been calculated for a wider frequency range, the variations in them are smaller than the variations of the spectrum components P(f). These variations are caused especially by random noise in the signal. Because random variations in the components S(s) used for the calculation are smaller, also the variations of calculated suppression coefficients G(s) between subsequent frames are smaller. Because the same suppression coefficient G(s) is, according to above, employed for multiplying several samples of the frequency response X(f), it results in smaller variations in frequency domain within the same frame. This results in enhanced voice quality, because too steep a variation of suppression coefficients sounds unpleasant.

Figure 2:
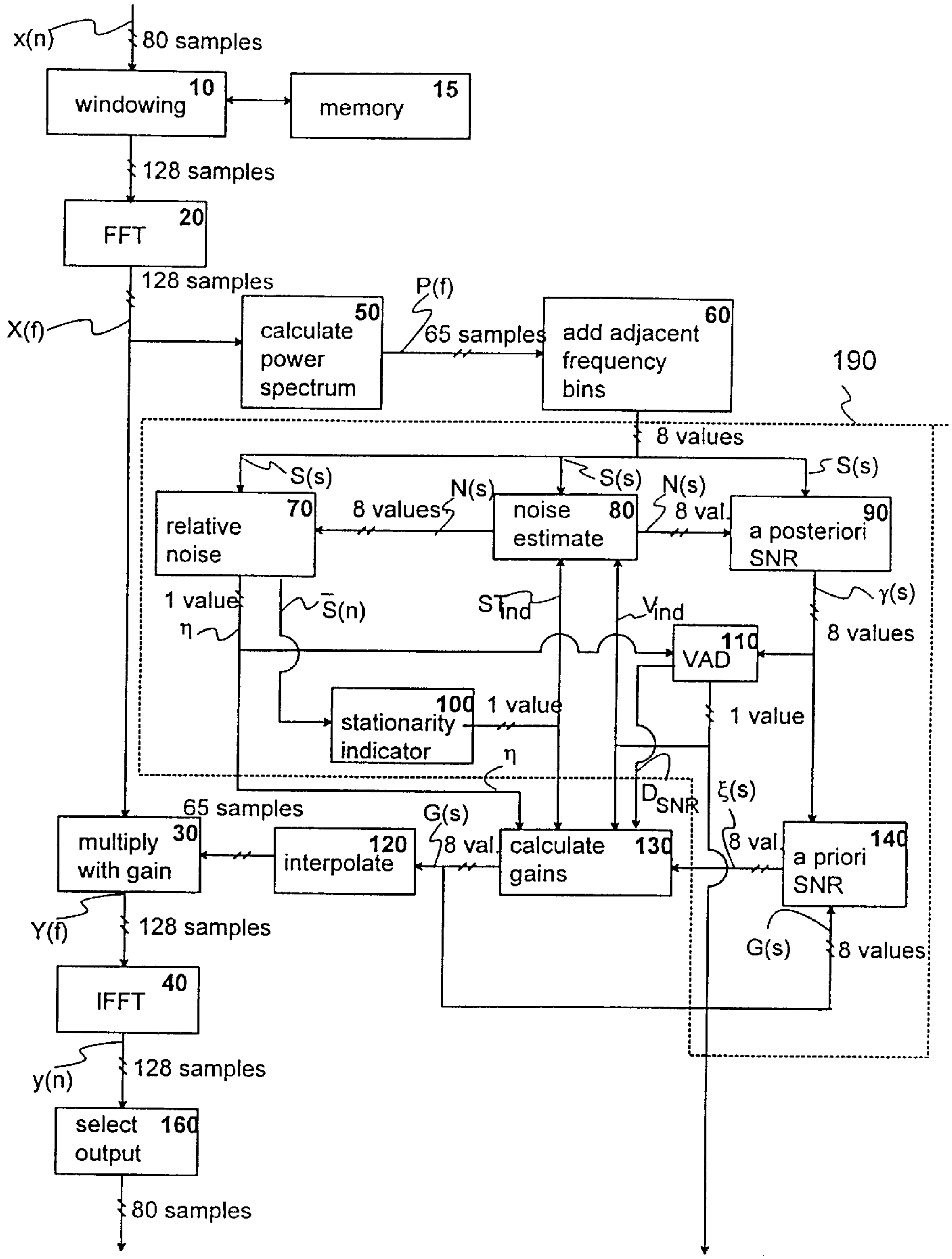
FIG. 2 presents a more detailed block diagram on a noise suppressor according to the invention.

The following is a closer description of one embodiment according to the invention, with reference mainly to FIG. 2. The parameter values presented in the following description are exemplary values and describe one embodiment of the invention, but they do not by any means limit the function of the method according to the invention to only certain parameter values. In the example solution it is assumed that the length of the FFT calculation is 128 samples and that the frame length used by the speech codec is 160 samples, each speech frame comprising 20 ms of speech. Additionally, in the example case recombining of spectrum components is presented, reducing the number of spectrum components from 65 to 8.

FIG. 2 presents a more detailed block diagram of one embodiment of a device according to the invention. In FIG. 2 the input to the device is an A/D-converted microphone signal, which means that a speech signal has been sampled into a digital speech frame comprising 80 samples. A speech frame is brought to windowing block 10, in which it is multiplied by the window. Because in the windowing used in this example windows partly overlap, the overlapping samples are stored in memory (block 15) for the next frame. 80 samples are taken from the signal and they are combined with 16 samples stored during the previous frame, resulting in a total of 96 samples. Respectively out of the last collected 80 samples, the last 16 samples are stored for calculating of next frame.

Figure 3:
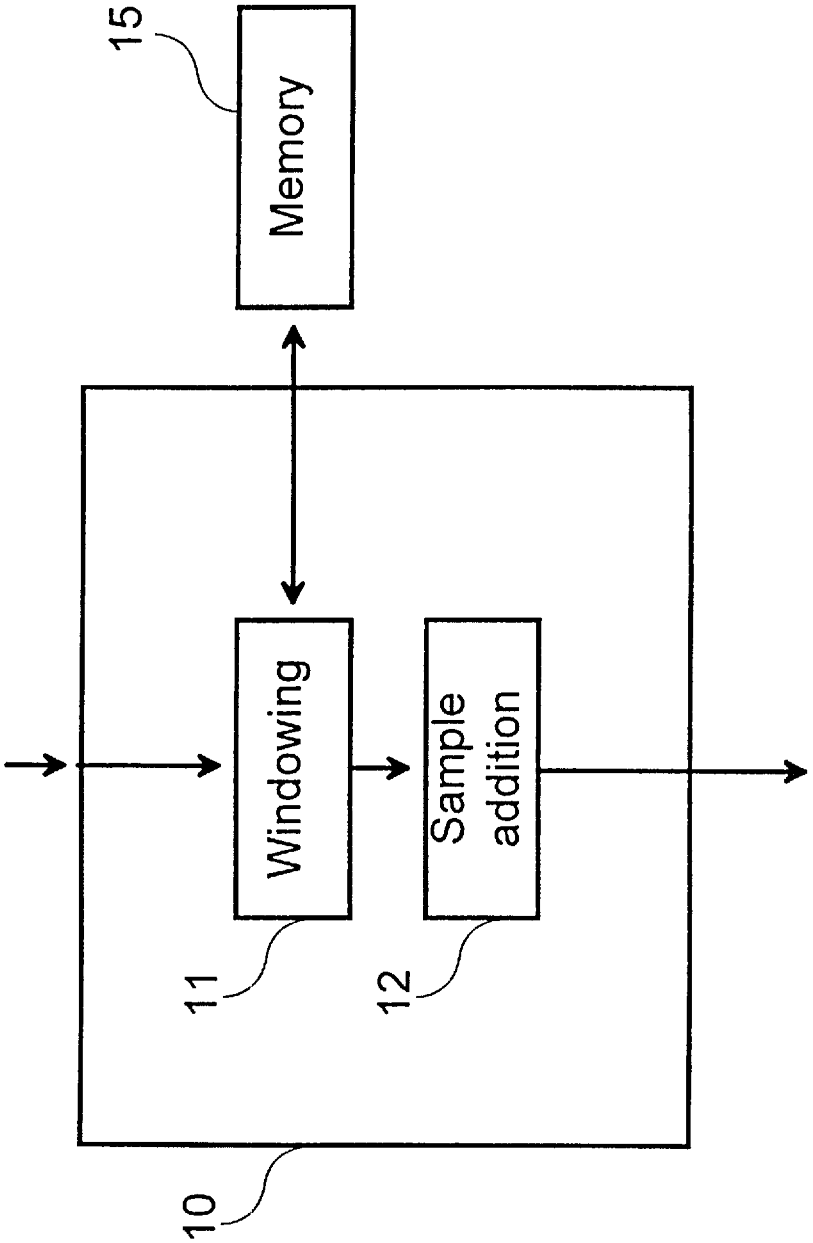
FIG. 3 presents in the form of a block diagram the realization of a windowing block.
Figure 10:
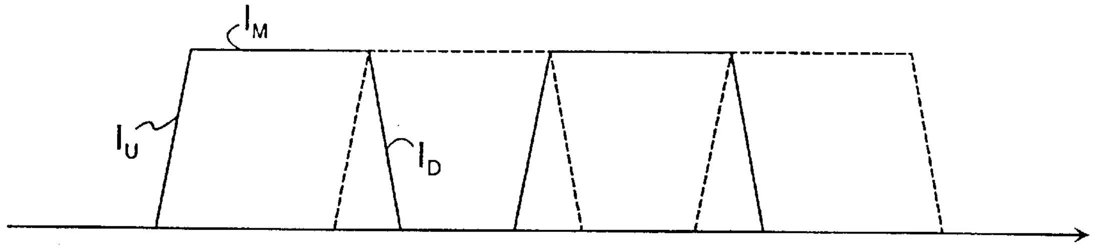
FIG. 10 presents subsequent speech signal frames in windowing according to the invention.

In this way any given 96 samples are multiplied in windowing block 10 by a window comprising 96 sample values, the 8 first values of the window forming the ascending strip $I_U$ of the window, and the 8 last values forming the descending strip $I_D$ of the window, as presented in FIG. 10. The window I(n) can be defined as follows and is realized in block 11 (FIG. 3):

$$I(n)=(n+1)/9=I_U \quad n=0, \ldots, 7 \quad I(n)=1=I_M \quad n=8, \ldots, 87 \tag{1}$$

$$I(n)=(96-n)/9=I_D \quad n=88, \ldots, 95$$

Realizing of windowing (block 11) digitally is prior known to a person skilled in the art from digital signal processing. It has to be notified that in the window the middle 80 values (n=8, . . . 87 or the middle strip $I_M$) are =1, and accordingly multiplication by them does not change the result and the multiplication can be omitted. Thus only the first 8 samples and the last 8 samples in the window need to be multiplied. Because the length of an FFT has to be a power of two, in block 12 (FIG. 3) 32 zeroes (0) are added at the end of the 96 samples obtained from block 11, resulting in a speech frame comprising 128 samples. Adding samples at the end of a sequence of samples is a simple operation and the realization of block 12 digitally is prior known to a person skilled in the art.

After windowing carried out in windowing block 10, the spectrum of a speech frame is calculated in block 20 employing the Fast Fourier Transform, FFT. The real and imaginary components obtained from the FFT are magnitude squared and added together in pairs in squaring block 50, the output of which is the power spectrum of the speech frame. If the FFT length is 128, the number of power spectrum components obtained is 65, which is obtained by dividing the length of the FFT transform by two and incrementing the result with 1, in other words the length of FFT/2+1.

Samples x(0),x(1), . . . ,x(n); n=127 (or said 128 samples) in the frame arriving to FFT block 20 are transformed to frequency domain employing real FFT (Fast Fourier Transform), giving frequency domain samples X(0),X(1), . . . ,X(f);f=64 (more generally f=(n+1)/2), in which each sample comprises a real component $X_r(f)$ and an imaginary component $X_i(f)$:

$$X(f)=X_r(f)+jX_i(f), \ f=0, \ldots, 64 \tag{2}$$

Realizing Fast Fourier Transform digitally is prior known to a person skilled in the art. The power spectrum is obtained from squaring block 50 by calculating the sum of the second powers of the real and imaginary components, component by component:

$$P(f)=X_r^2(f)+X_i^2(f), \ f=0, \ldots, 64 \tag{3}$$

Figure 4:
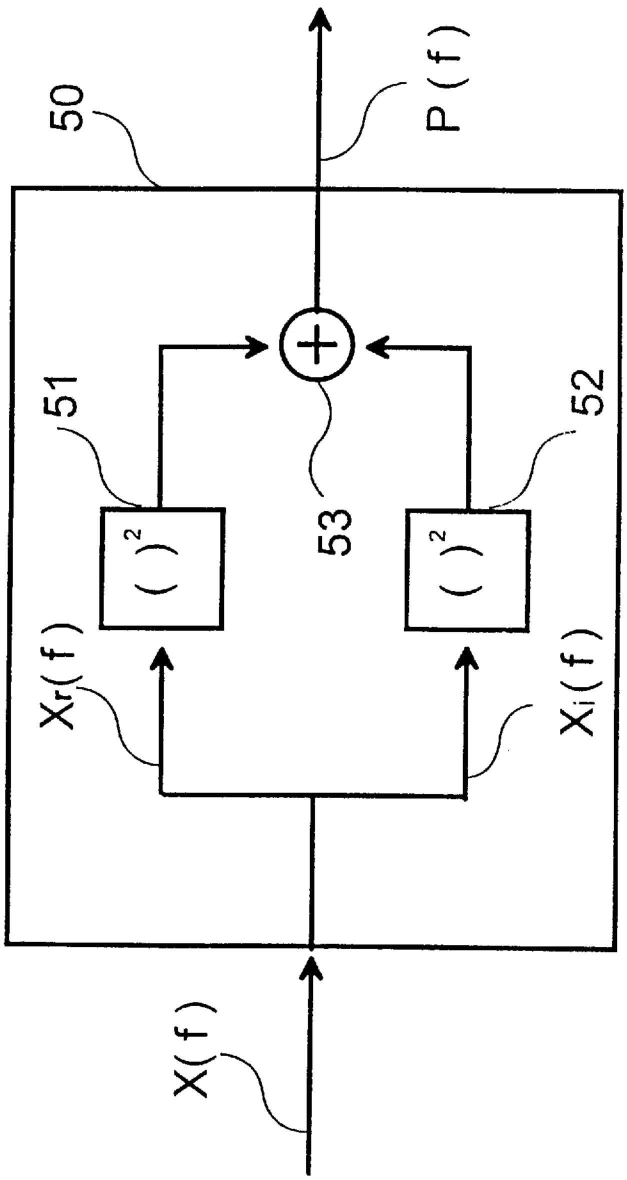
FIG. 4 presents the realization of a squaring block.

The function of squaring block 50 can be realized, as is presented in FIG. 4, by taking the real and imaginary components to squaring blocks 51 and 52 (which carry out a simple mathematical squaring, which is prior known to be carried out digitally) and by summing the squared components in a summing unit 53. In this way, as the output of squaring block 50, power spectrum components P(0), P(1), . . . ,P(f);f=64 are obtained and they correspond to the powers of the components in the time domain signal at different frequencies as follows (presuming that 8 kHz sampling frequency is used):

P(f) for values f=0, . . . , 64 corresponds to middle frequencies (f.4000/64 Hz) (4)

8 new power spectrum components, or power spectrum component combinations S(s), s=0, . . . 7 are formed in block 60 and they are here called calculation spectrum components. The calculation spectrum components S(s) are formed by summing always 7 adjacent power spectrum components P(f) for each calculation spectrum component S(s) as follows:

$$S(0)=P(1)+P(2)+\ldots P(7)$$

$$S(1)=P(8)+P(9)+\ldots P(14)$$

$$S(2)=P(15)+P(16)+\ldots P(21)$$

$$S(3)=P(22)+\ldots+P(28)$$

$$S(4)=P(29)+\ldots+P(35)$$

$$S(5)=P(36)+\ldots+P(42)$$

$$S(6)=P(43)+\ldots+P(49)$$

$$S(7)=P(50)+\ldots+P(56)$$

Figure 5:
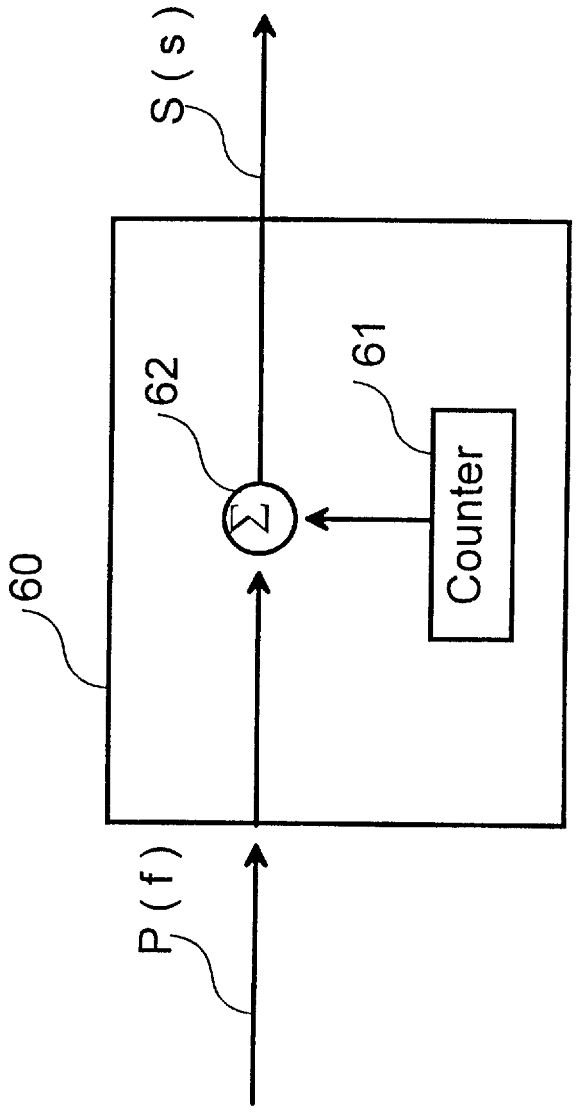
FIG. 5 presents the realization of a spectral recombination block.

This can be realized, as presented in FIG. 5, utilizing counter 61 and summing unit 62, so that the counter 61 always counts up to seven and, controlled by the counter, summing unit 62 always sums seven subsequent components and produces a sum as an output. In this case the lowest combination component S(0) corresponds to middle frequencies [62.5 Hz to 437.5 Hz] and the highest combination component S(7) corresponds to middle frequencies [3125 Hz to 3500 Hz]. The frequencies lower than this (below 62.5 Hz) or higher than this (above 3500 Hz) are not essential for speech and they are anyway attenuated in telephone systems, and, accordingly, using them for the calculating of suppression coefficients is not wanted.

Other kinds of division of the frequency range could be used as well to form calculation spectrum components S(s) from the power spectrum components P(f). For example, the number of power spectrum components P(f) combined into one calculation spectrum component S(s) could be different for different frequency bands, corresponding to different calculation spectrum components, or different values of s. Furthermore, a different number of calculation spectrum components S(s) could be used, i.e., a number greater or smaller than eight.

It has to be noted, that there are several other methods for recombining components than summing adjacent components. Generally, said calculation spectrum components S(s) can be calculated by weighting the power spectrum components P(f) with suitable coefficients as follows:

$$S(s)=a(0)P(0)+a(1)P(1)+\ldots+a(64)P(64), \qquad (5)$$

in which coefficients a(0) to a(64) are constants (different coefficients for each component S(s), s=0, . . . ,7).

As presented above, the quantity of spectrum components, or frequency ranges, has been reduced considerably by summing components of several ranges. The next stage, after forming calculation spectrum components, is the calculation of suppression coefficients.

When calculating suppression coefficients, the before mentioned calculation spectrum components S(s) are used and suppression coefficients G(s), s=0, . . . ,7 corresponding to them are calculated in calculation block 130. Frequency domain samples X(0),X(1), . . . ,X(f), f=0, . . . ,64 are multiplied by said suppression coefficients. Each coefficient G(s) is used for multiplying the samples, based upon which the components S(s) have been calculated, e.g. samples X(15), . . . ,X(21) are multiplied by G(2). Additionally, the lowest sample X(0) is multiplied by the same coefficient as sample X(1) and the highest samples X(57), . . . ,X(64) are multiplied by the same coefficient as sample X(56).

Multiplication is carried out by multiplying real and imaginary components separately in multiplying unit 30, whereby as its output is obtained $$Y(f)=G(s)X(f)=G(s)X_r(f)+jG(s)X_i(f),\ f=0,\ldots,64,\ s=0,\ldots,7 \qquad (6)$$

In this way samples Y(f) f=0, . . . ,64 are obtained, of which a real inverse fast Fourier transform is calculated in IFFT block 40, whereby as its output are obtained time domain samples y(n), n=0, . . . ,127, in which noise has been suppressed.

More generally, suppression for each frequency domain sample X(0),X(1), . . . ,X(f), f=0, . . . ,64 can be calculated as a weighted sum of several suppression coefficients as follows:

$$Y(s)=(b(0)G(0)+b(1)G(1)+\ldots+b(7)G(7))X(f), \qquad (6a)$$

in which coefficients b(0) . . . b(7) are constants (different coefficients for each component X(f), f=0, . . . ,64).

As there are only 8 calculation spectrum components S(s), calculating of suppression coefficients based upon them is considerably easier than if the power spectrum components P(f), the quantity of which is 65, were used for calculation. As each new calculation spectrum component S(s) has been calculated for a wider range, their variations are smaller than the variations of the power spectrum components P(f). These variations are caused especially by random noise in the signal. Because random variations in the calculation spectrum components S(s) used for the calculation are smaller, also the variations of the calculated suppression coefficients G(s) between subsequent frames are smaller. Because the same suppression coefficient G(s) is, according to above, employed for multiplying several samples of the frequency response X(f), it results in smaller variations in frequency domain within a frame. This results in enhanced voice quality, because too steep a variation of suppression coefficients sounds unpleasant.

In calculation block 90 a posteriori signal-to-noise ratio is calculated on each frequency band as the ratio between the power spectrum component of the concerned frame and the corresponding component of the background noise model, as presented in the following.

Figure 9:
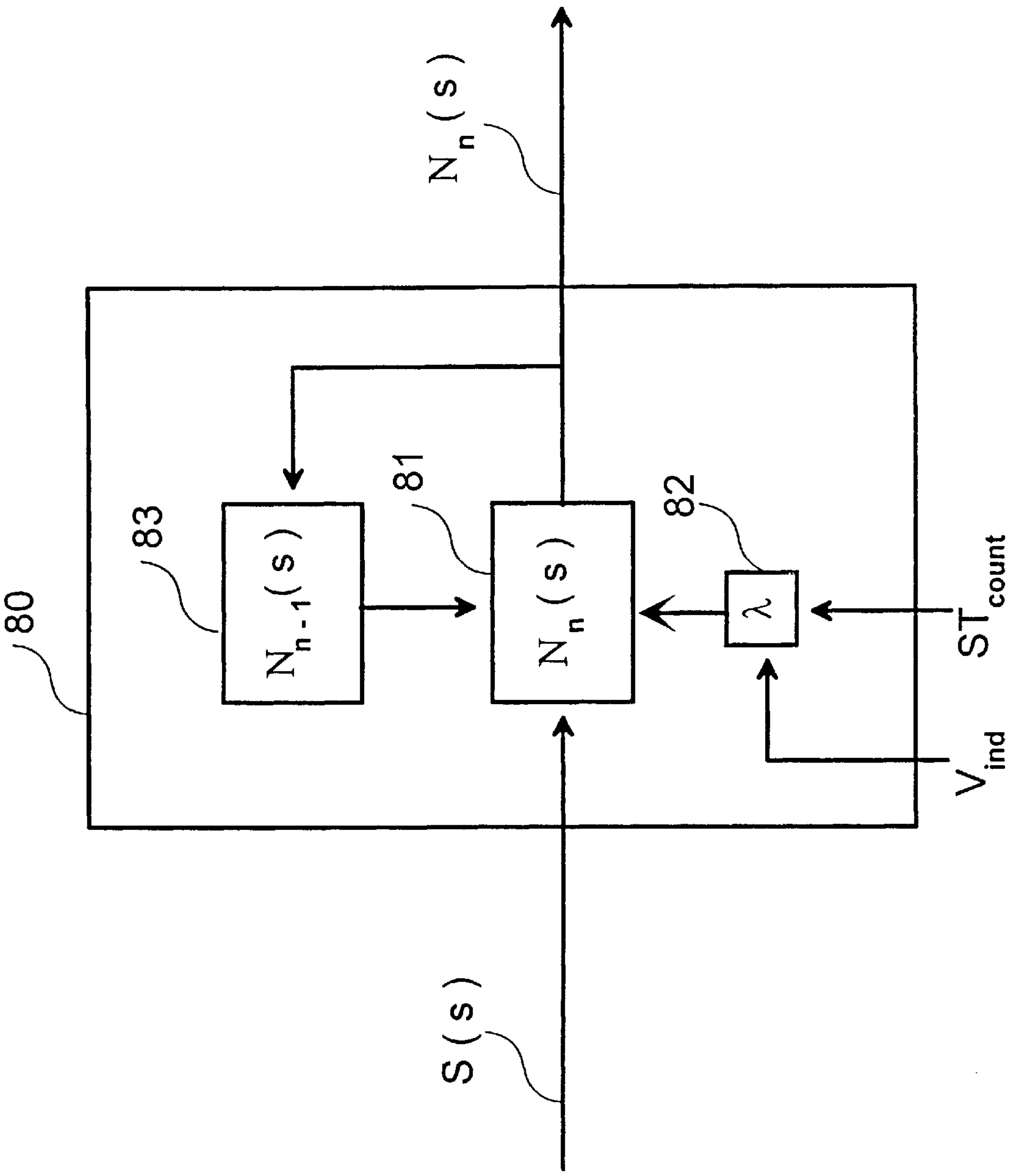
FIG. 9 presents the arrangement for calculating a background noise model.

The spectrum of noise N(s), s=0, . . . ,7 is estimated in estimation block 80, which is presented in more detail in FIG. 9, when the voice activity detector does not detect speech. Estimation is carried out in block 80 by calculating recursively a time-averaged mean value for each component of the spectrum S(s), s=0, . . . ,7 of the signal brought from block 60:

$$N_n(s)=\lambda N_{n-1}(s)+(1-\lambda)S(s)\ s=0,\ldots,7. \qquad (7)$$

In this context $N_{n-1}(s)$ means a calculated noise spectrum estimate for the previous frame, obtained from memory 83, as presented in FIG. 9, and $N_n(s)$ means an estimate for the present frame (n=frame order number) according to the equation above. This calculation is carried out preferably digitally in block 81, the inputs of which are spectrum components S(s) from block 60, the estimate for the previous frame $N_{n-1}(s)$ obtained from memory 83 and the value for variable λ calculated in block 82. The variable λ depends on the values of $V_{ind}'$ (the output of the voice activity detector) and $ST_{count}$ (variable related to the control of updating the background noise spectrum estimate), the calculation of which are presented later. The value of the variable λ is determined according to the next table (typical values for λ):

| ($V_{ind}'$, $ST_{count}$) | λ |
|---|---|
| (0,0) | 0.9 (normal updating) |
| (0,1) | 0.9 (normal updating) |
| (1,0) | 1 (no updating) |
| (1,1) | 0.95 (slow updating) |

Later a shorter symbol N(s) is used for the noise spectrum estimate calculated for the present frame. The calculation according to the above estimation is preferably carried out digitally. Carrying out multiplications, additions and subtractions according to the above equation digitally is well known to a person skilled in the art.

From input spectrum and noise spectrum a ratio γ(s), s=0, . . . ,7 is calculated, component by component, in calculation block 90 and the ratio is called a posteriori signal-to-noise ratio:

$$\gamma(s)=\frac{S(s)}{N(s)}. \tag{8}$$

The calculation block 90 is also preferably realized digitally, and it carries out the above division. Carrying out a division digitally is as such prior known to a person skilled in the art. Utilizing this a posteriori signal-to-noise ratio estimate γ(s) and the suppression coefficients $\tilde{G}(s)$, s=0, . . . ,7 of the previous frame, an a priori signal-to-noise ratio estimate $\hat{\xi}(s)$, to be used for calculating suppression coefficients is calculated for each frequency band in a second calculation unit 140, which estimate is preferably realized digitally according to the following equation:

$$\hat{\xi}_n(s,n)=max(\xi\_min,\ \mu\tilde{G}_{n-1}^{2}(s)\gamma_{n-1}(s)+(1-\mu)P(\gamma_n(s)-1)). \tag{9}$$

Figure 7:
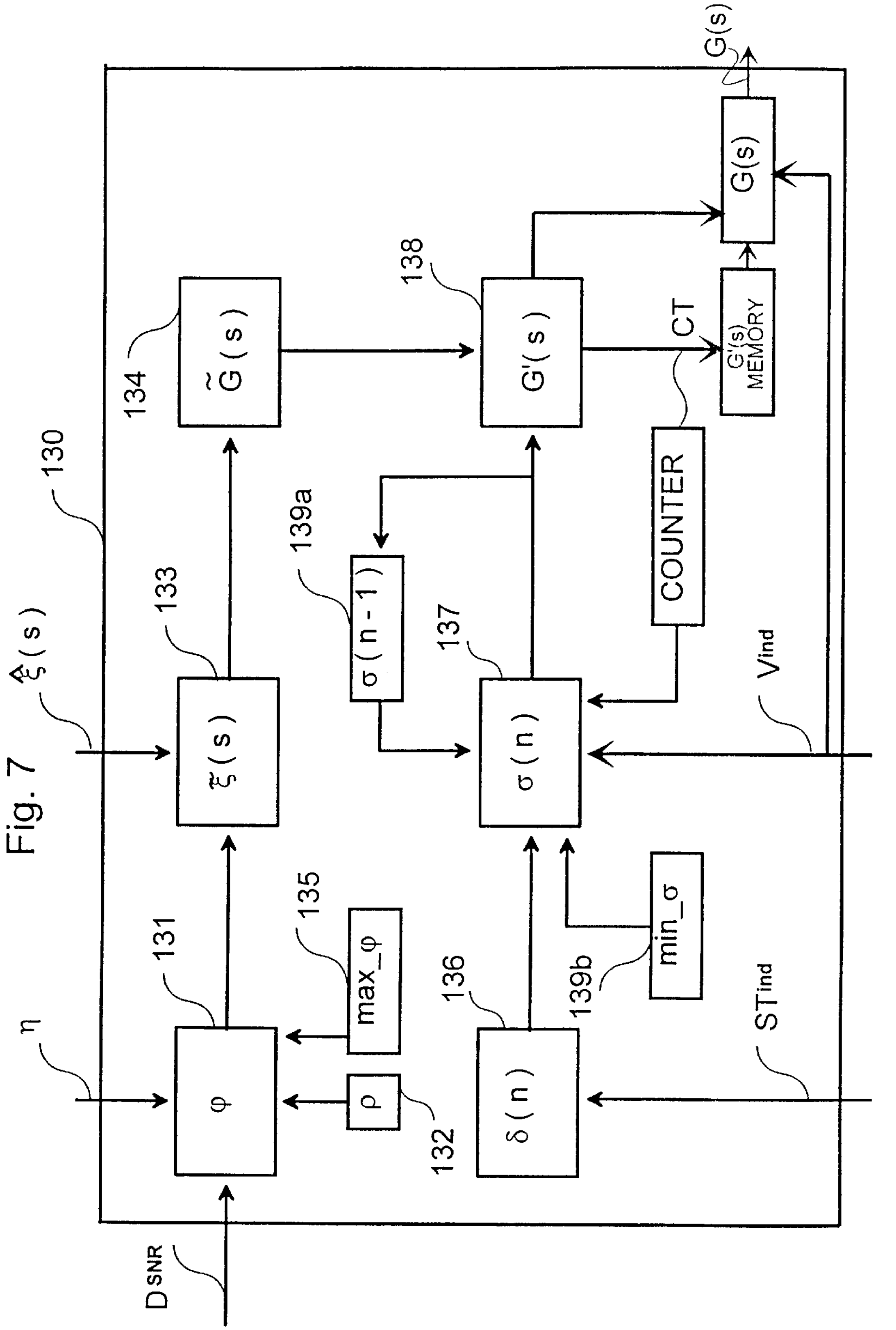
FIG. 7 presents the realization of a block for calculating suppression coefficients.
Figure 8:
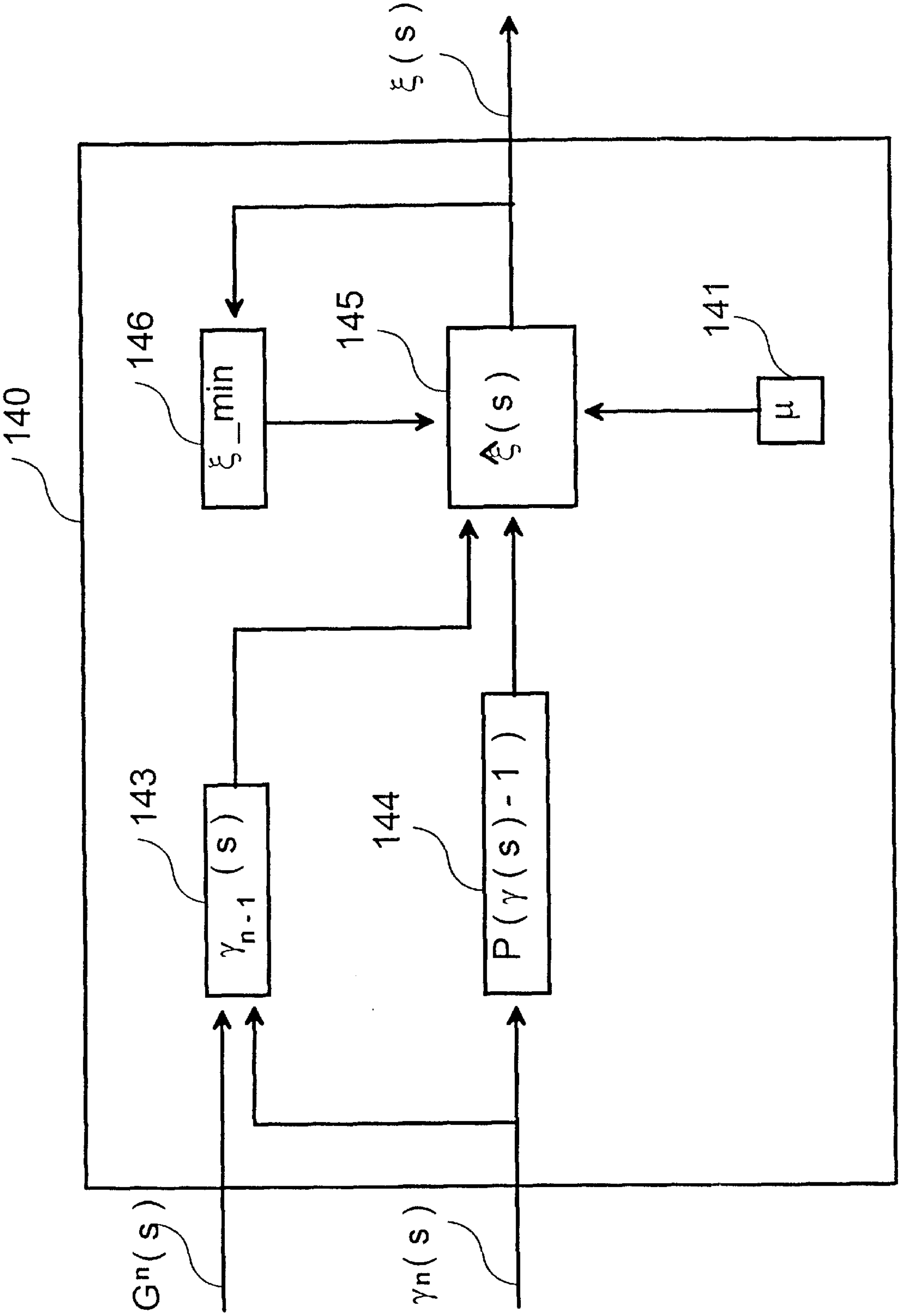
FIG. 8 presents an arrangement for calculating signal-to-noise ratio.

Here n stands for the order number of the frame, as before, and the subindexes refer to a frame, in which each estimate (a priori signal-to-noise ratio, suppression coefficients, a posteriori signal-to-noise ratio) is calculated. A more detailed realization of calculation block 140 is presented in FIG. 8. The parameter μ is a constant, the value of which is 0.0 to 1.0, with which the information about the present and the previous frames is weighted and that can e.g. be stored in advance in memory 141, from which it is retrieved to block 145, which carries out the calculation of the above equation. The coefficient μ can be given different values for speech and noise frames, and the correct value is selected according to the decision of the voice activity detector (typically μ is given a higher value for noise frames than for speech frames). ξ_min is a minimum of the a priori signal-to-noise ratio that is used for reducing residual noise, caused by fast variations of signal-to-noise ratio, in such sequences of the input signal that contain no speech. ξ_min is held in memory 146, in which it is stored in advance. Typically the value of ξ_min is 0.35 to 0.8. In the previous equation the function $P(\gamma_n(s)-1)$ realizes half-wave rectification:

$$P(\gamma_n(s)-1)=\begin{cases}\gamma_n(s)-1; & \gamma_n(s)-1\geqq 0\\ 0; & \text{otherwise}\end{cases} \tag{10}$$

the calculation of which is carried out in calculation block 144, to which, according to the previous equation, the a posteriori signal-to-noise ratio γ(s), obtained from block 90, is brought as an input. As an output from calculation block 144 the value of the function $P(\gamma_n(s)-1)$ is forwarded to block 145. Additionally, when calculating the a priori signal-to-noise ratio estimate $\hat{\xi}(s)$, the a posteriori signal-to-noise ratio $\gamma_{n-1}(s)$ for the previous frame is employed, multiplied by the second power of the corresponding suppression coefficient of the previous frame. This value is obtained in block 145 by storing in memory 143 the product of the value of the a posteriori signal-to-noise ratio γ(s) and of the second power of the corresponding suppression coefficient calculated in the same frame. Suppression coefficients G(s) are obtained from block 130, which is presented in more detail in FIG. 7, and in which, to begin with, coefficients $\tilde{G}(s)$ are calculated from equation $$\tilde{G}(s)=\frac{\tilde{\xi}(s)}{1+\tilde{\xi}(s)}, \tag{11}$$

in which a modified estimate $\tilde{\xi}(s)$ (s), s=0, . . . ,7 of the a priori signal-to-noise ratio estimate $\hat{\xi}_n(s,n)$ is used, the calculation of $\tilde{\xi}(s)$ being presented later with reference to FIG. 7. Also realization of this kind of calculation digitally is prior known to a person skilled in the art.

When this modified estimate $\tilde{\xi}(s)$ is calculated, an insight according to this invention of utilizing relative noise level is employed, which is explained in the following:

In a method according to the invention, the adjusting of noise suppression is controlled based upon relative noise level η (the calculation of which is described later on), and using additionally a parameter calculated from the present frame, which parameter represents the spectral distance $D_{SNR}$ between the input signal and a noise model, the calculation of which distance is described later on. This parameter is used for scaling the parameter describing the relative noise level, and through it, the values of a priori signal-to-noise ratio $\hat{\xi}_n(s,n)$. The values of the spectrum distance parameter represent the probability of occurrence of speech in the present frame. Accordingly the values of the a priori signal-to-noise ratio $\hat{\xi}_n$ (s,n) are increased the less the more cleanly only background noise is contained in the frame, and hereby more effective noise suppression is reached in practice. When a frame contains speech, the suppression is lesser, but speech masks noise effectively in both frequency and time domain. Because the value of the spectrum distance parameter used for suppression adjustment has continuous value and it reacts immediately to changes in signal power, no discontinuities are inflicted in the suppression adjustment, which would sound unpleasant.

It is characteristic of prior known methods of noise suppression, that the more powerful noise is compared with speech, the more distortion noise suppression inflicts in speech. In the present invention the operation has been improved so that gliding mean values $\overline{S}(n)$ and $\overline{N}(n)$ are recursively calculated from speech and noise powers. Based upon them, the parameter η representing relative noise level is calculated and the noise suppression G(s) is adjusted by it.

Said mean values and parameter are calculated in block 70, a more detailed realization of which is presented in FIG. 6 and which is described in the following. The adjustment of suppression is carried out by increasing the values of a priori signal-to-noise ratio $\hat{\xi}_n(s,n)$, based upon relative noise level η. Hereby the noise suppression can be adjusted according to relative noise level η so that no significant distortion is inflicted in speech.

To ensure a good response to transients in speech, the suppression coefficients G(s) in equation (11) have to react quickly to speech activity. Unfortunately, increased sensitivity of the suppression coefficients to speech transients increase also their sensitivity to nonstationary noise, making the residual noise sound less smooth than the original noise. Moreover, since the estimation of the shape and the level of the background noise spectrum N(s) in equation (7) is carried out recursively by arithmetic averaging, the estimation algorithm can not adapt fast enough to model quickly varying noise components, making their attenuation inefficient. In fact, such components may be even better distinguished after enhancement because of the reduced masking of these components by the attenuated stationary noise.

Undesirable varying of residual noise is also produced when the spectral resolution of the computation of the suppression coefficients is increased by increasing the number of spectrum components. This decreased smoothness is a consequence of the weaker averaging of the power spectrum components in frequency domain. Adequate resolution, on the other hand, is needed for proper attenuation during speech activity and minimization of distortion caused to speech.

A nonoptimal division of the frequency range may cause some undesirable fluctuation of low frequency background noise in the suppression, if the noise is highly concentrated at low frequencies. Because of the high content of low frequency noise in speech, the attenuation of the noise in the same low frequency range is decreased in frames containing speech, resulting in an unpleasant-sounding modulation of the residual noise in the rhythm of speech.

The three problems described above can be efficiently diminished by a minimum gain search. The principle of this approach is motivated by the fact that at each frequency component, signal power changes more slowly and less randomly in speech than in noise. The approach smoothens and stabilizes the result of background noise suppression, making speech sound less deteriorated and the residual background noise smoother, thus improving the subjective quality of the enhanced speech. Especially, all kinds of quickly varying nonstationary background noise components can be efficiently attenuated by the method during both speech and noise. Furthermore, the method does not produce any distortions to speech but makes it sound cleaner of corrupting noise. Moreover, the minimum gain search allows for the use of an increased number of frequency components in the computation of the suppression coefficients G(s) in equation (11) without causing extra variation to residual noise.

In the minimum gain search method, the minimum values of the suppression coefficients G'(s) in equation (24) at each frequency component s is searched from the current and from, e.g., 1 to 2 previous frame(s) depending on whether the current frame contains speech or not. The minimum gain search approach can be represented as:

$$G(s,n)=\min_{k=j,\ldots,n}\{G'(s,k)\},\ j=\begin{cases} n-2, & \text{if } V'_{ind}=0 \\ n-1, & \text{if } V'_{ind}=1 \end{cases}, \tag{12}$$

where G(s,n) denotes the suppression coefficient at frequency s in frame n after the minimum gain search and $V_{ind}'$ represents the output of the voice activity detector, the calculation of which is presented later.

The suppression coefficients G'(s) are modified by the minimum gain search according to equation (12) before multiplication in block 30 (in FIG. 2) of the complex FFT with the suppression coefficients. The minimum gain can be performed in block 130 or in a separate block inserted between blocks 130 and 120.

The number of previous frames over which the minima of the suppression coefficients are searched can also be greater than two. Moreover, other kinds of non-linear (e.g., median, some combination of minimum and median, etc.) or linear (e.g., average) filtering operations of the suppression coefficients than taking the minimum can be used as well in the present invention.

The arithmetical complexity of the presented approach is low. Because of the limitation of the maximum attenuation by introducing a lower limit for the suppression coefficients in the noise suppression, and because the suppression coefficients relate to the amplitude domain and are not power variables, hence reserving a moderate dynamic range, these coefficients can be efficiently compressed. Thus, the consumption of static memory is low, though suppression coefficients of some previous frames have to be stored. The memory requirements of the described method of smoothing the noise suppression result compare beneficially to, e.g., utilizing high resolution power spectra of past frames for the same purpose, which has been suggested in some previous approaches.

Figure 6:
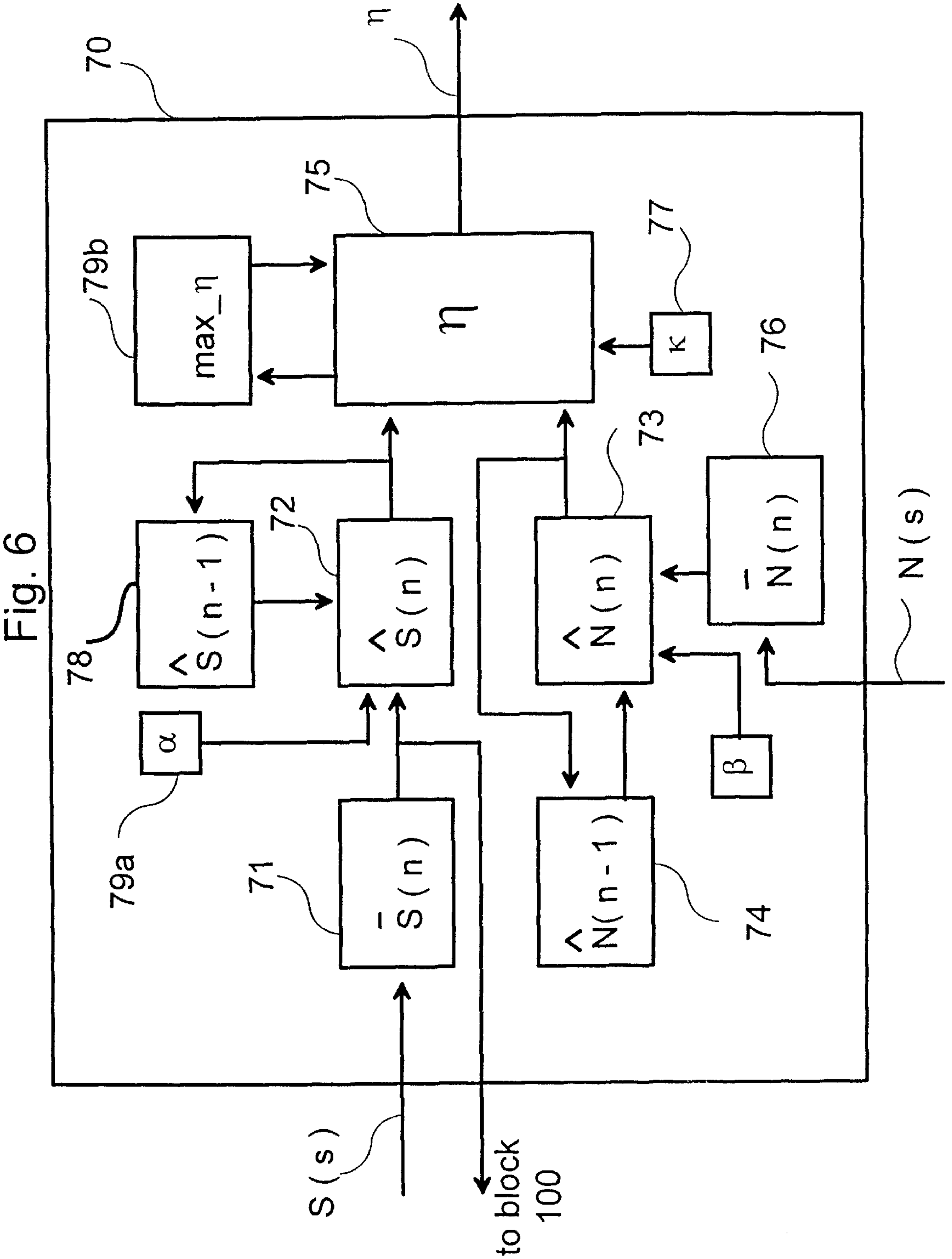
FIG. 6 presents the realization of a block for calculation of relative noise level.

In the block presented in FIG. 6 the time averaged mean value for speech $\hat{S}(n)$ is calculated using the power spectrum estimate S(s), S=0, . . . ,7. The time averaged mean value $\hat{S}(n)$ is updated when voice activity detector 110 (VAD) detects speech. First the mean value for components $\bar{S}(n)$ in the present frame is calculated in block 71, into which spectrum components S(s) are obtained as an input from block 60, as follows:

$$\bar{S}(n)=\frac{1}{8}\sum_{s=0}^{7}S(s). \tag{13}$$

The time averaged mean value $\hat{S}(n)$ is obtained by calculating in block 72 (e.g. recursively) based upon a time averaged mean value $\hat{S}(n-1)$ for the previous frame, which is obtained from memory 78, in which the calculated time averaged mean value has been stored during the previous frame, the calculation spectrum mean value $\bar{S}(n)$ obtained from block 71, and time constant α which has been stored in advance in memory 79*a:*

$$\hat{S}(n)=\alpha\hat{S}(n-1)+(1-\alpha)\bar{S}(n). \tag{14}$$

in which n is the order number of a frame and α is said time constant, the value of which is from 0.0 to 1.0, typically between 0.9 to 1.0. In order to not contain very weak speech in the time averaged mean value (e.g. at the end of a sentence), it is updated only if the mean value of the spectrum components for the present frame exceeds a threshold value dependent on time averaged mean value. This threshold value is typically one quarter of the time averaged mean value. The calculation of the two previous equations is preferably executed digitally.

Correspondingly, the time averaged mean value of noise power $\hat{N}(n)$ is obtained from calculation block 73 by using the power spectrum estimate of noise N(s), s=0, . . . ,7 and component mean value $\bar{N}(n)$ calculated from it according to the next equation:

$$\hat{N}(N)=\beta\hat{N}(n-1)+(1-\beta)\bar{N}(n), \tag{15}$$

in which β is a time constant, the value of which is 0.0. to 1.0, typically between 0.9 to 1.0. The noise power time averaged mean value is updated in each frame. The mean value of the noise spectrum components $\bar{N}(n)$ is calculated in block 76, based upon spectrum components N(s), as follows:

$$\bar{N}(n)=\frac{1}{8}\sum_{s=0}^{7}N(s) \tag{16}$$

and the noise power time averaged mean value $\hat{N}(n-1)$ for the previous frame is obtained from memory 74, in which it was stored during the previous frame. The relative noise level η is calculated in block 75 as a scaled and maxima limited quotient of the time averaged mean values of noise and speech $$\eta=\min\left(\text{max\_}\eta,\ \kappa\frac{\hat{N}}{\hat{S}}\right), \tag{17}$$

in which κ is a scaling constant (typical value 4.0), which has been stored in advance in memory 77, and max_n is the maximum value of relative noise level (typically 1.0), which has been stored in memory 79*b*.

From this parameter for relative noise level $\eta$, the final correction term used in suppression adjustment is obtained by scaling it with a parameter representing the distance between input signal and noise model, $D_{SNR}$, which is calculated in the voice activity detector 110 utilizing a posteriori signal-to-noise ratio $\gamma(s)$, which by digital calculation realizes the following equation:

$$D_{SNR} = \sum_{s=s\_l}^{s\_h} \upsilon_s \gamma(s); \tag{18}$$

in which s_l and s_h are the index values of the lowest and highest frequency components included and $\upsilon_s$=weighting coefficient for component, which are predetermined and stored in advance in a memory, from which they are retrieved for calculation. Typically, all a posteriori signal-to-noise estimate value components s_l=0 and s_h=7 are used, an they are weighted equally $\upsilon_s$=1.0/8.0; s=0, . . . , 7.

Figure 11:
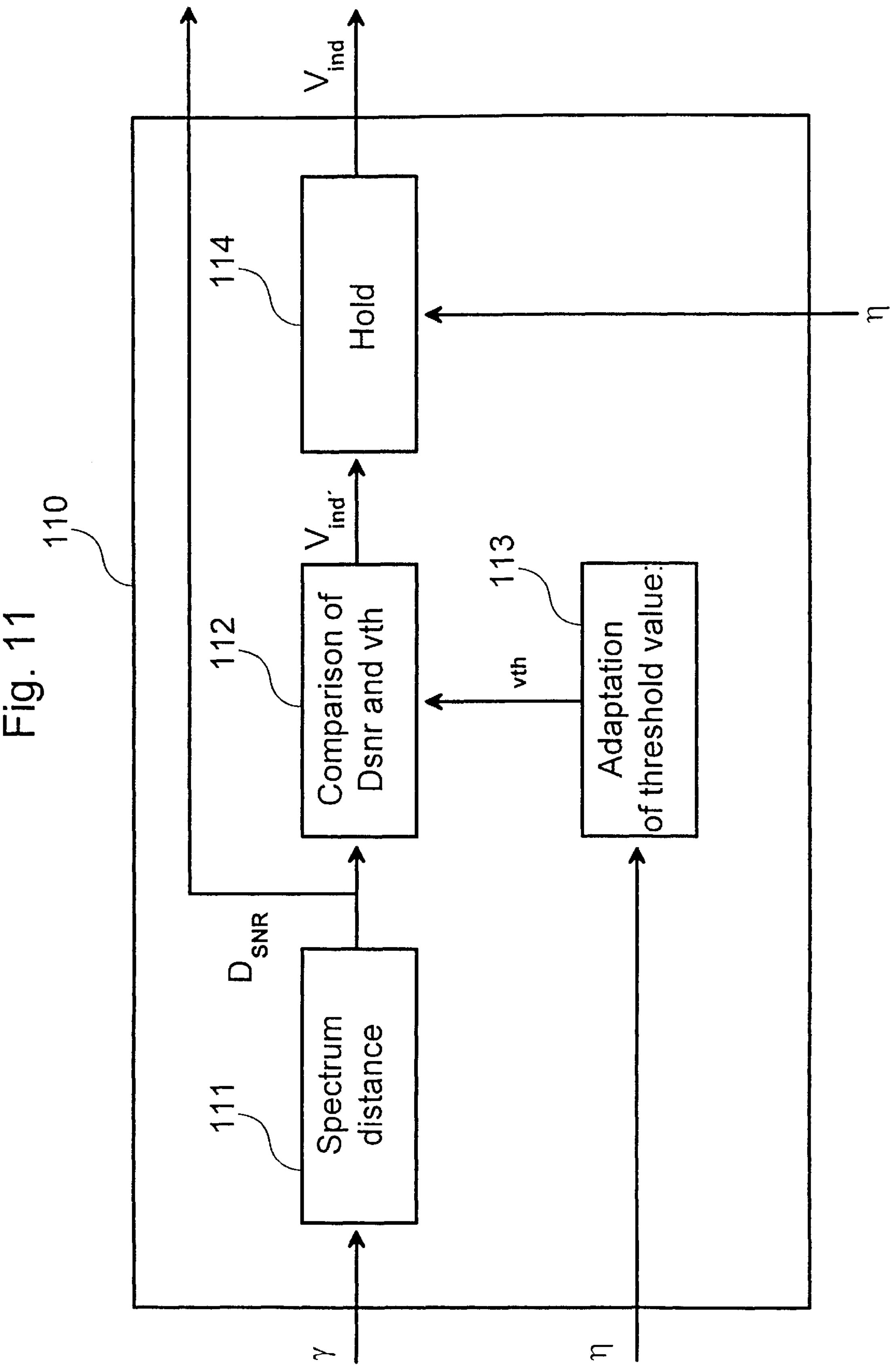
FIG. 11 presents in form of a block diagram the realization of a voice activity detector.

The following is a closer description of the embodiment of a voice activity detector 110, with reference to FIG. 11. The embodiment of the voice activity detector is novel and particularly suitable for using in a noise suppressor according to the invention, but the voice activity detector could be used also with other types of noise suppressors, or to other purposes, in which speech detection is employed, e.g. for controlling a discontinuous connection and for acoustic echo cancellation. The detection of speech in the voice activity detector is based upon signal-to-noise ratio, or upon the a posteriori signal-to-noise ratio on different frequency bands calculated in block 90, as can be seen in FIG. 2. The signal-to-noise ratios are calculated by dividing the power spectrum components S(s) for a frame (from block 60) by corresponding components N(s) of background noise estimate (from block 80). A summing unit 111 in the voice activity detector sums the values of the a posteriori signal-to-noise ratios, obtained from different frequency bands, whereby the parameter $D_{SNR}$, describing the spectrum distance between input signal and noise model, is obtained according to the above equation (18), and the value from the summing unit is compared with a predetermined threshold value vth in comparator unit 112. If the threshold value is exceeded, the frame is regarded to contain speech. The summing can also be weighted in such a way that more weight is given to the frequencies, at which the signal-to-noise ratio can be expected to be good. The output of the voice activity detector can be presented with a variable $V_{ind}'$, for the values of which the following conditions are obtained:

$$\begin{cases} V_{ind}' = 1; & D_{SNR} > vth \\ V_{ind}' = 0; & D_{SNR} \leqq vth \end{cases} . \tag{19}$$

Because the voice activity detector 110 controls the updating of background spectrum estimate N(s), and the latter on its behalf affects the function of the voice activity detector in a way described above, it is possible that the background spectrum estimate N(s) stays at a too low a level if background noise level suddenly increases. To prevent this, the time (number of frames) during which subsequent frames are regarded to contain speech is monitored. If this number of subsequent frames exceeds a threshold value max_spf, the value of which is e.g. 50, the value of variable $ST_{COUNT}$ is set at 1. The variable $ST_{COUNT}$ is reset to zero when $V_{ind}'$ gets a value 0.

A counter for subsequent frames (not presented in the figure but included in FIG. 9, block 82, in which also the value of variable $ST_{COUNT}$ is stored) is however not incremented, if the change of the energies of subsequent frames indicates to block 80, that the signal is not stationary. A parameter representing stationarity $ST_{ind}$ is calculated in block 100. If the change in energy is sufficiently large, the counter is reset. The aim of these conditions is to make sure that a background spectrum estimate will not be updated during speech. Additionally, background spectrum estimate N(s) is reduced at each frequency band always when the power spectrum component of the frame in question is smaller than the corresponding component of background spectrum estimate N(s). This action secures for its part that background spectrum estimate N(s) recovers to a correct level quickly after a possible erroneous update.

The conditions of stationarity can be seen in equation (27), which is presented later in this document. Item a) corresponds to a situation with a stationary signal, in which the counter of subsequent speech frames is incremented. Item b) corresponds to unstationary status, in which the counter is reset and item c) a situation in which the value of the counter is not changed.

Additionally, in the invention the accuracy of voice activity detector 110 and background spectrum estimate N(s) are enhanced by adjusting said threshold value vth of the voice activity detector utilizing relative noise level $\eta$ (which is calculated in block 70). In an environment in which the signal-to-noise ratio is very good (or the relative noise level $\eta$ is low), the value of the threshold vth is increased based upon the relative noise level $\eta$. Hereby interpreting rapid changes in background noise as speech is reduced. Adaptation of threshold value is carried out in block 113 according to the following equation:

$$vth = max(vth\_min,\ vth\_fix + vth\_slope \cdot \eta) \tag{20}$$

in which vth_fix; vth_min, and vth_slope are constants, typical values for which are e.g: vth_fix=2.5; vth_min=2.0; vth_slope=−8.0.

An often occurring problem in a voice activity detector 110 is that just at the beginning of speech the speech is not detected immediately and also the end of speech is not detected correctly. This, on its behalf, causes that background noise estimate N(s) gets an incorrect value, which again affects the later results of the voice activity detector. This problem can be eliminated by updating the background noise estimate using a delay. In this case a certain number N (e.g. N=4) of power spectra $S_1$ (s), . . . ,$S_N$(s) of the last frames are stored before updating the background noise estimate N(s). If during the last double amount of frames (or during 2*N frames) the voice activity detector 110 has not detected speech, the background noise estimate N(s) is updated with the oldest power spectrum $S_1$(s) in memory, in any other case updating is not done. With this it is ensured, that N frames before and after the frame used at updating have been noise. The problem with this method is that it requires quite a lot of memory, or N*8 memory locations. The consumption of memory can be further optimized by first calculating the mean values of next M power spectra $\tilde{S}_1$ (s) to memory location A, and after that the mean values of M (e.g. M=4) the next power spectra $\tilde{S}_2$(n) to memory location B. If during the last 3*M frames the voice activity detector has detected only noise, the background noise estimate is updated with the values stored in memory location A. After that memory location A is reset and the power spectrum mean value $\tilde{S}_1$ (n) for the next M frames is calculated. When it has been calculated, the background noise spectrum estimate N(s) is updated with the values in memory location B if there has been only noise during the last 3*M frames. The process is continued in this way, calculating mean values alternatingly to memory locations A and B. In this way only 2*8 memory locations is needed (memory locations A and B contain 8 values each).

The voice activity detector 110 can also be enhanced in such a way that the voice activity detector is forced to give, still after a speech burst, decisions meaning speech during N frames (e.g. N=1) (this time is called 'hold time'), although voice activity detector detects only noise. This enhances the operation, because as speech is slowly becoming more quiet it could happen otherwise that the end of speech will be taken for noise.

Said hold time can be made adaptively dependent on the relative noise level $\eta$. In this case during strong background noise, the hold time is slowly increased compared with a quiet situation. The hold feature can be realized as follows: hold time n is given values 0,1,. . . ,N, and threshold values $\eta_0, \eta_1, \ldots, \eta_{N-1}$; $\eta_1<\eta_{1+1}$, for relative noise level are calculated, which values can be regarded as corresponding to hold times. In real time a hold time is selected by comparing the momentary value of relative noise level with the threshold values. For example (N=1, $\eta_0$=0.01):

$$\begin{cases} n = 0; & \eta \leqq 0.01 \\ n = 1; & \eta > 0.01 \end{cases} . \tag{21}$$

The VAD decision including this hold time feature is denoted by $V_{ind}$.

Preferably the hold-feature can be realized using a delay block 114, which is situated in the output of the voice activity detector, as presented in FIG. 11. In patent U.S. Pat. No. 4,811,404 a method for updating a background spectrum estimate has been presented, in which, when a certain time has elapsed since the previous updating of the background spectrum estimate, a new updating is executed automatically. In this invention updating of background noise spectrum estimate is not executed at certain intervals, but, as mentioned before, depending on the result of the detection of the voice activity detector. When the background noise spectrum estimate has been calculated, the updating of the background noise spectrum estimate is executed only if the voice activity detector has not detected speech before or after the current frame. By this procedure the background noise spectrum estimate can be given as correct a value as possible. This feature, among others, and other before mentioned features (e.g. that the value of threshold value vth, based upon which it is determined whether speech is present or not, is adjusted based upon relative noise level, that is taking into account the level of both speech and noise) enhance essentially both the accuracy of the background noise spectrum estimate and the operation of the voice activity detector.

In the following calculation of suppression coefficients G'(s) is described, referring to FIG. 7. A correction term $\phi$ controlling the calculation of suppression coefficients is obtained from block 131 by multiplying the parameter for relative noise level n by the parameter for spectrum distance $D_{SNR}$ and by scaling the product with a scaling constant $\rho$, which has been stored in memory 132, and by limiting the maxima of the product:

$$\phi=\min(\max\_\phi,\rho D_{SNR}\eta), \tag{22}$$

in which $\rho$=scaling constant (typical value 8.0) and max_$\phi$ is the maximum value of the corrective term (typically 1.0), which has been stored in advance in memory 135.

Adjusting the calculation of suppression coefficients $\tilde{G}(s)$ (s=0, . . . ,7) is carried out in such a way, that the values of a priori signal-to-noise ratio $\hat{\xi}(s)$, obtained from calculation block 140 according to equation (9), are first transformed by a calculation in block 133, using the correction term $\phi$ calculated in block 131 as follows:

$$\tilde{\xi}(s)=(1+\phi)\hat{\xi}(s), \tag{23}$$

and suppression coefficients $\tilde{G}(s)$ are further calculated in block 134 from equation (11).

When the voice activity detector 110 detects that the signal no more contains speech, the signal is suppressed further, employing a suitable time constant. The voice activity detector 110 indicates whether the signal contains speech or not by giving a speech indication output $V_{ind}'$, that can be e.g. one bit, the value of which is 0, if no speech is present, and 1 if the signal contains speech. The additional suppression is further adjusted based upon a signal stationarity indicator $ST_{ind}$, calculated in mobility detector 100. By this method suppression of more quiet speech sequences can be prevented, which sequences the voice activity detector 110 could interpret as background noise.

The additional suppression is carried out in calculation block 138, which calculates the suppression coefficients G'(s). At the beginning of speech the additional suppression is removed using a suitable time constant. The additional suppression is started when according to the voice activity detector 110, after the end of speech activity a number of frames, the number being a predetermined constant (hangover period), containing no speech have been detected. Because the number of frames included in the period concerned (hangover period) is known, the end of the period can be detected utilizing a counter CT, that counts the number of frames.

Suppression coefficients G'(s) containing the additional suppression are calculated in block 138, based upon suppression values $\tilde{G}(s)$ calculated previously in block 134 and an additional suppression coefficient $\sigma$ calculated in block 137, according to the following equation:

$$G'(s)=\sigma\tilde{G}(s), \tag{24}$$

in which $\sigma$ is the additional suppression coefficient, the value of which is calculated in block 137 by using the value of difference term $\delta(n)$, which is determined in block 136 based upon the stationarity indicator $ST_{ind}$, the value of additional suppression coefficient $\sigma(n-1)$ for the previous frame obtained from memory 139*a*, in which the suppression coefficient was stored during the previous frame, and the minimum value of suppression coefficient min_$\sigma$, which has been stored in memory 139*b* in advance. Initially the additional suppression coefficient is $\sigma$=1 (no additional suppression) and its value is adjusted based upon indicator $V_{ind}'$, when the voice activity detector 110 detects frames containing no speech, as follows:

$$\begin{cases} \sigma(n) = 1 & n = n_0 \\ \sigma(n) = \min(1, \max(\min\_\sigma,(1 + \delta(n))\sigma(n - 1))); & n = n_0 + 1, n_0 + 2, \ldots \end{cases} \tag{25}$$

in which n=order number for a frame and $n_0$=is the value of the order number of the last frame belonging to the period preceding additional suppression. The minimum of the additional suppression coefficient a is minima limited by min_σ, which determines the highest final suppression (typically a value 0.5 . . . 1.0). The value of the difference term δ(n) depends on the stationarity of the signal. In order to determine the stationarity, the change in the signal power spectrum mean value S(n) is compared between the previous and the current frame. The value of the difference term δ(n) is determined in block 136 as follows:

$$\begin{cases} \delta(n)=\delta_s;\ \text{on condition}\quad a) \\ \delta(n)=\delta_n;\ \text{on condition}\quad b) \\ \delta(n)=\delta_m;\ \text{on condition}\quad c) \end{cases} \tag{26}$$

in which the value of the difference term is thus determined according to conditions a), b) and c), which conditions are determined based upon stationarity indicator $ST_{ind}$. The comparing of conditions a), b) and c) is carried out in block 100, whereupon the stationarity indicator $ST_{ind}$, obtained as an output, indicates to block 136, which of the conditions a), b) and c) has been met, whereupon block 100 carries out the following comparison:

$$\begin{cases} a)\quad \frac{1}{th\_s}\,\overline{S}(n-1) < \overline{S}(n) < th\_s\overline{S}(n-1), \\ b)\quad \overline{S}(n) > th\_n\overline{S}(n-1)\text{tai}\ \overline{S}(n) < \frac{1}{th\_n}\,\overline{S}(n-1), \\ c)\quad \text{otherwise.} \end{cases} \tag{27}$$

Constants th_s and th_n are higher than 1 (typical values e.g. th_s=6.0/5.0 and th_n=2.0 or e.g. th_s=3.0/2.0 and th_n=8.0. The values of difference terms $\delta_s$ $\delta_n$ and $\delta_m$ are selected in such a way, that the difference of additional suppression between subsequent frames does not sound disturbing, even if the value of stationarity indicator $ST_{ind}$ would vary frequently (typically $\delta_S \in[-0.014, 0)$, $\delta_n \in(0, 0.028]$ and $\delta_m$=0).

When the voice activity detector 110 again detects speech, the additional suppression is removed by calculating the additional suppression coefficient σ in block 137 as follows:

$$\sigma(n)=min(1,(1+\delta_r)\sigma(n-1));\ n=n_1,\ n_1+1,\ .\ .\ .\ , \tag{28}$$

in which $n_1$,=the order number of the first frame after a noise sequence and $\delta_r$ is positive, a constant the absolute value of which is in general considerably higher than that of the above mentioned difference constants adjusting the additional suppression (typical value e.g. (1.0-min_σ) /4.0), that has been stored in a memory in advance, e.g. in memory 139*b*. The functions of the blocks presented in FIG. 7 are preferably realized digitally. Executing the calculation operations of the equations, to be carried out in block 130, digitally is prior known to a person skilled in the art.

The eight suppression values G(s) obtained from the suppression value calculation block 130 are interpolated in an interpolator 120 into sixty-five samples in such a way, that the suppression values corresponding to frequencies (0–62.5. Hz and 3500 Hz–4000 Hz) outside the processed frequency range are set equal to the suppression values for the adjacent processed frequency band. Also the interpolator 120 is preferably realized digitally.

In multiplier 30 the real and imaginary components $X_r$(f) and $X_i$(f), produced by FFT block 20, are multiplied in pairs by suppression values obtained from the interpolator 120, whereby in practice always eight subsequent samples X(f) from FFT block are multiplied by the same suppression value G(s), whereby samples are obtained, according to the already earlier presented equation (6), as the output of multiplier 30, Hereby samples Y(f) f=0, . . . ,64 are obtained, from which a real inverse fast Fourier transform is calculated in IFFT block 40, whereby as its output time domain samples y(n), n=0, . . . , 127 are obtained, in which noise has been suppressed. The samples y(n), from which noise has been suppressed, correspond to the samples x(n) brought into FFT block.

Out of the samples y(n) 80 samples are selected in selection block 160 to the output, for transmission, which samples are y(n); n=8, . . . ,87, the x(n) values corresponding to which had not been multiplied by a window strip, and thus they can be sent directly to output. In this case to the output 80 samples are obtained, the samples corresponding to the samples that were read as input signal to windowing block 10. Because in the presented embodiment samples are selected out of the eighth sample to the output, but the samples corresponding to the current frame only begin at the sixteenth sample (the first 16 were samples stored in memory from the previous frame) an 8 sample delay or 1 ms delay is caused to the signal. If initially more samples had been read, e.g. 112 (112+16 samples of the previous frame=128), there would not have been any need to add zeros to the signal, and as a result of this said 112 samples had been directly obtained in the output. However, now it was wanted to get to the output at a time 80 samples, so that after calculations on two subsequent frames 160 samples are obtained, which again is equal to what most of the presently used speech codecs (e.g. in GSM mobile phones) utilize. Hereby noise suppression and speech encoding can be combined effectively without causing any delay, except for the above mentioned 1 ms. For the sake of comparison, it can be said that in solutions according to state of the art, the delay is typically half the length of the window, whereby when using a window according to the exemplary solution presented here, the length of which window is 96 frames, the delay would be 48 samples, or 6 ms, which delay is six times as long as the delay reached with the solution according to the invention.

Figure 12:
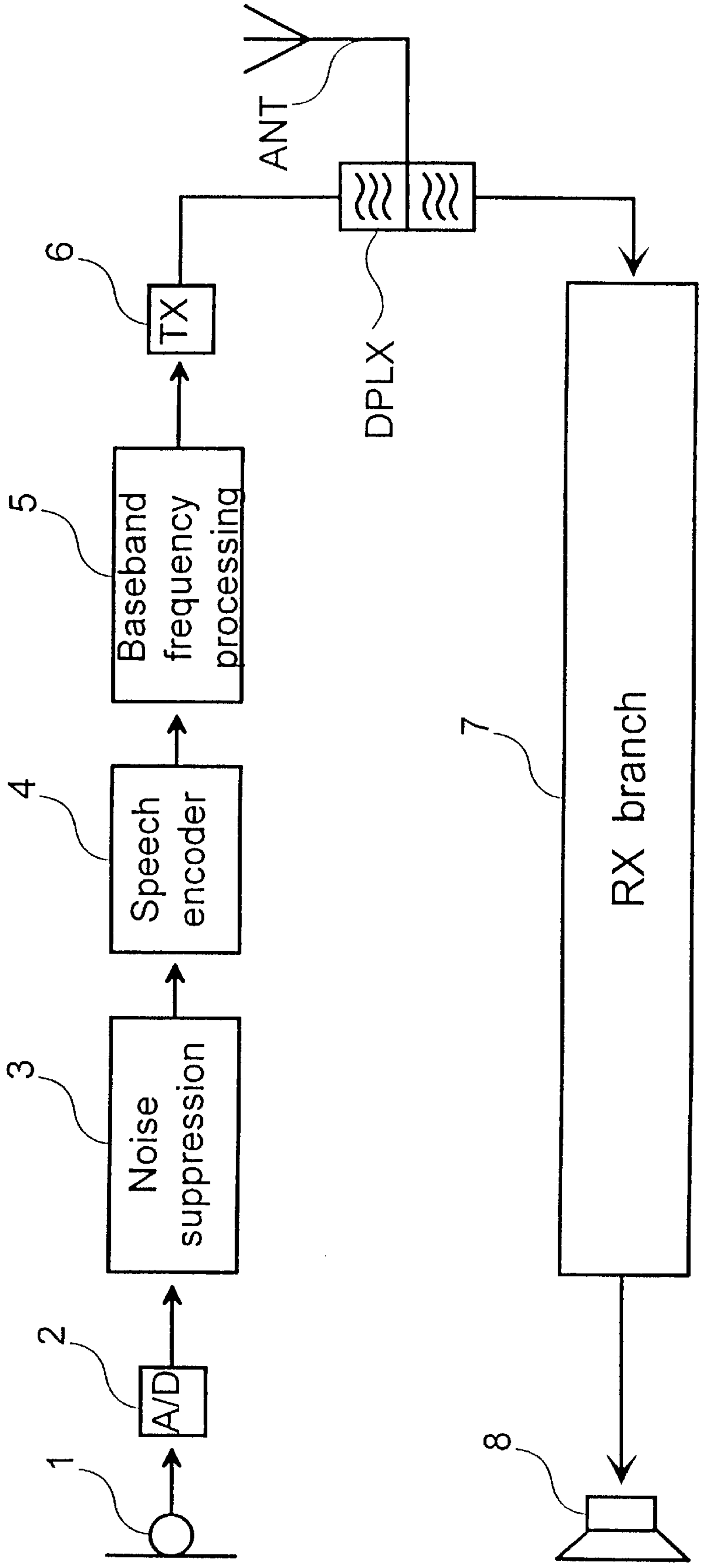
FIG. 12 presents in form of a block diagram a mobile station according to the invention.

The method according to the invention and the device for noise suppression are particularly suitable to be used in a mobile station or a mobile communication system, and they are not limited to any particular architecture (TDMA, CDMA, digital/analog). FIG. 12 presents a mobile station according to the invention, in which noise suppression according to the invention is employed. The speech signal to be transmitted, coming from a microphone 1, is sampled in an A/D converter 2, is noise suppressed in a noise suppressor 3 according to the invention, and speech encoded in a speech encoder 4, after which base frequency signal processing is carried out in block 5, e.g. channel encoding, interleaving, as known in the state of art. After this the signal is transformed into radio frequency and transmitted by a transmitter 6 through a duplex filter DPLX and an antenna ANT. The known operations of a reception branch 7 are carried out for speech received at reception, and it is repeated through loudspeaker 8.

Here realization and embodiments of the invention have been presented by examples on the method and the device. It is evident for a person skilled in the art that the invention is not limited to the details of the presented embodiments and that the invention can be realized also in another form without deviating from the characteristics of the invention. The presented embodiments should only be regarded as illustrating, not limiting. Thus the possibilities to realize and use the invention are limited only by the enclosed claims.

Hereby different alternatives for the implementing of the invention defined by the claims, including equivalent realizations, are included in the scope of the invention.

We claim:

1. A noise suppressor for suppressing noise in a speech signal, which suppressor comprises means for dividing said speech signal in a first amount of subsignals, which subsignals represent certain first frequency ranges, and suppression means for suppressing noise in a subsignal based upon a determined suppression coefficient, wherein it additionally comprises recombination means for recombining a second amount of subsignals into a calculation signal which represents a certain second frequency range, which is wider than said first frequency ranges, determination means for determining a suppression coefficient for the calculation signal based upon noise contained in it, and that the suppression means are arranged to suppress the subsignals recombined into the calculation signal, with said suppression coefficient determined based upon the calculation signal.

2. A noise suppressor according to claim 1, wherein it comprises spectrum forming means for dividing the speech signal into spectrum components representing said subsignals.

3. A noise suppressor according to claim 1, wherein it comprises sampling means for sampling the speech signal into samples in time domain, windowing means for framing samples into a frame, processing means for forming frequency domain components of said frame, that the spectrum forming means are arranged to form said spectrum components from the frequency domain components, that the recombination means are arranged to recombine the second amount of spectrum components into a calculation spectrum component representing said calculation signal, that the determination means comprise calculation means for calculating a suppression coefficient for said calculation spectrum component based upon noise contained in the latter, and that the suppression means comprise a multiplier for multiplying the frequency domain components corresponding to the spectrum components recombined into the calculation spectrum component by said suppression coefficient, in order to form noise-suppressed frequency domain components, and that it comprises means for converting said noise-suppressed frequency domain components into a time domain signal and for outputting it as a noise-suppressed output signal.

4. A noise suppressor according to claim 3, wherein said calculation means comprise means for determining the mean level of a noise component and a speech component contained in the input signal and means for calculating the suppression coefficient for said calculation spectrum component, based upon said noise and speech levels.

5. A noise suppressor according to claim 3, wherein the output signal of said noise suppressor has been arranged to be fed into a speech codec for speech encoding and the amount of samples of said output signal is an even quotient of the number of samples in a speech frame.

6. A noise suppressor according to claim 3, wherein said processing means for forming the frequency domain components comprise a certain spectral length, and said windowing means comprise multiplication means for multiplying samples by a certain window and sample generating means for adding samples to the multiplied samples in order to form a frame, the length of which is equal to said spectral length.

7. A noise suppressor according to claim 4, wherein it comprises a voice activity detector for detecting speech and pauses in a speech signal and for giving a detection result to the means for calculating the suppression coefficient for adjusting suppression dependent on occurrence of speech in the speech signal.

8. A noise suppressor according to claim 4, wherein said suppression coefficients calculating means (130) are arranged to further modify the suppression coefficient (G) for the present frame by a value based on the present frame and a value based on a past frame.

9. A noise suppressor according to claim 7, wherein it comprises means for comparing the signal brought into the detector with a certain threshold value in order to make a speech detection decision and means for adjusting said threshold value based upon the mean level of the noise component and the speech component.

10. A noise suppressor according to claim 7, wherein it comprises noise estimation means for estimating the level of said noise and for storing the value of said level and that during each analyzed speech signal the value of a noise estimate is updated only if the voice activity detector has not detected speech during a certain time before and after each detected speech signal.

11. A noise suppressor according to claim 10, wherein it comprises stationarity indication means for indicating the stationarity of the speech signal and said noise estimation means are arranged to update said value of noise estimate, based upon the indication of stationarity when the indication indicates the signal to be stationary.

12. A mobile station for transmission and reception of speech, comprising a microphone for converting the speech to be transmitted into a speech signal and, for suppression of noise in the speech signal it comprises means for dividing said speech signal into a first amount of subsignals, which subsignals represent certain first frequency ranges, and suppression means for suppressing noise in a subsignal based upon a determined suppression coefficient, wherein it further comprises recombination means for recombining a second amount of subsignals into a calculation signal that represents a second frequency range, which is wider than said first frequency ranges, determination means for determining a suppression coefficient for the calculation signal based upon the noise contained by it, and that the suppression means are arranged to suppress the subsignals combined into the calculation signal, with said suppression coefficient determined based upon the calculation signal.

13. A method of noise suppression for suppressing noise in a speech signal, in which method said speech signal is divided into a first amount of subsignals, which subsignals represent certain first frequency ranges, and noise in a subsignal is suppressed based upon a determined suppression coefficient wherein prior to noise suppression a second amount of subsignals are recombined into a calculation signal that represents a certain second frequency range, which is wider than said first frequency ranges, a suppression coefficient is determined for the calculation signal based upon the noise contained by it and the subsignals recombined into the calculation signal are suppressed by said suppression coefficient determined based upon the calculation signal.

14. A method for suppressing noise in a speech signal, the method comprising the steps of:

for each speech frame, dividing the speech signal into N subsignals of first frequency ranges;

recombining the N subsignals into M calculation signals of second frequency ranges that are wider than the first frequency ranges but narrower than the frequency range of the speech signal, wherein M<N;

calculating a suppression coefficient for each of the M calculation signals based upon noise contained in the calculation signal; and suppressing noise in each of the N subsignals by using the suppression coefficient calculated for the calculation signal that comprises the subsignal.

15. A method as set forth in claim 14, wherein the step of dividing the speech signal further comprises the steps of:

sampling the speech signal;

windowing the sampled speech signal to form frames; and forming spectrum components for the frames, wherein the spectrum components represent the plurality of subsignals.

16. A method as set forth in claim 14, wherein the step of recombining the N subsignals comprises a step of summing K subsignals to produce one of the M calculation signals.

17. A method as set forth in claim 16, wherein K=7 subsignals in adjacent frequency ranges.

18. A method as set forth in claim 14, wherein the step of calculating the suppression coefficient operates by calculating the suppression coefficient for each of the M calculation signals based upon a relative noise level, a noise model, a spectral distance between each of the M calculation signals and the noise model, and a stationarity of each of the M calculation signals.

19. A method as set forth in claim 18, wherein the step of suppressing noise in each of the N subsignals further comprises the steps of:

interpolating the suppression coefficients for each of the M calculation signals of the second frequency ranges to correspond to the N subsignals of the first frequency ranges; and multiplying each of the N subsignals by the interpolated suppression coefficient calculated for the calculation signal that comprises the subsignal to suppress the noise in each of the N subsignals.

* * * * *